R. L. J. DELAMARE.
APPARATUS FOR CUTTING TOOTHED GEAR WHEELS.
APPLICATION FILED JULY 8, 1920.

1,401,323.

Patented Dec. 27, 1921.
2 SHEETS—SHEET 1.

Inventor.
R. L. J. Delamare.
By H. R. Kerslake
Atty.

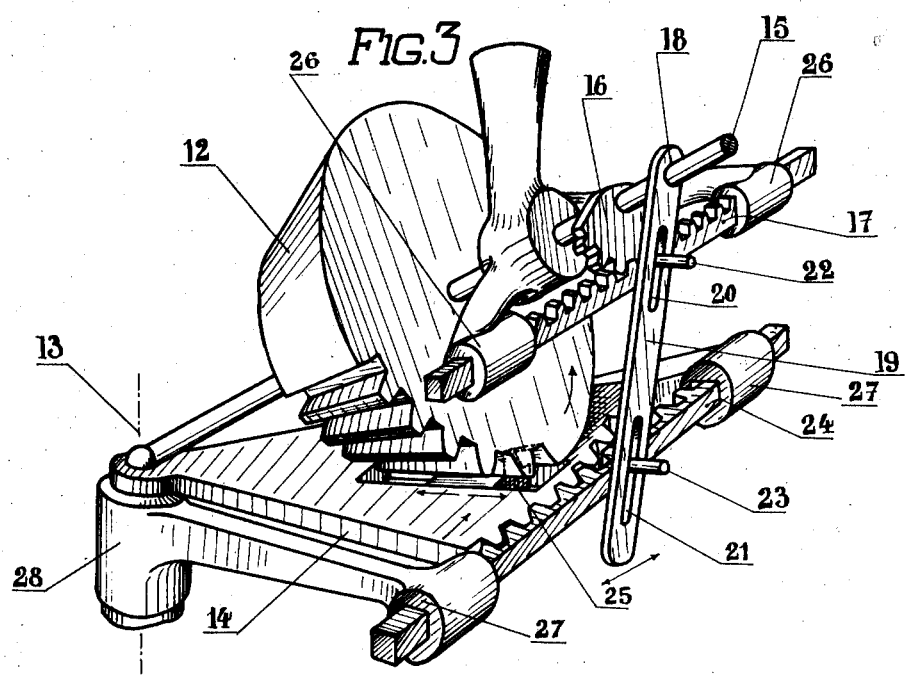
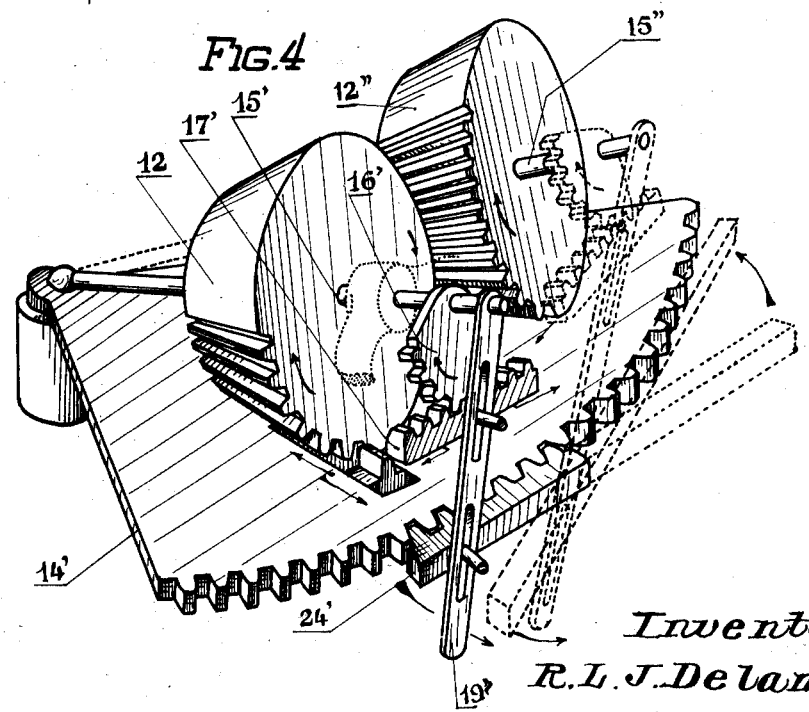

UNITED STATES PATENT OFFICE.

RENÉ LOUIS JULES DELAMARE, OF BOIS-COLOMBES, FRANCE.

APPARATUS FOR CUTTING TOOTHED GEAR-WHEELS.

1,401,323.  Specification of Letters Patent.  Patented Dec. 27, 1921.

Application filed July 8, 1920. Serial No. 394,811.

*To all whom it may concern:*

Be it known that I, RENÉ LOUIS JULES DELAMARE, a citizen of the French Republic, residing at Bois-Colombes, Seine, France, have invented Improvements in Apparatus for Cutting Toothed Gear-Wheels, (for which I have filed applications in France, official #486,607, Aug. 28, 1917; England, Prov. #16,557, Aug. 28, 1917; Germany, Prov. #37,830, June 22, 1920; Switzerland, Off. #89,984, July 5, 1920,) of which the following is a specification.

In the cutting of straight, cone or bevel gear wheels, the tool to which is given a reciprocating cutting movement corresponding to the notches of the wheel to be cut, is mounted on a member called the toothed rack which should receive in relation to the wheel to be cut, a displacement corresponding to the rolling without slipping of the pitch circle (for straight tooth or spur gearing) or of the primitive cone (for cone or bevel gearing) of the gearing on a straight line or on a plane of the tool-holder. This relative movement, of which the ratio is different in each particular case, is obtained by means of a certain number of guides corresponding to certain values of this ratio and by means of variable gearings so as to obtain approximately the intermediary ratios.

Apparatus according to the present invention comprises connecting devices between the wheel to be cut and the toothed rack tool-holder which enables a correct rolling of the two members, the one in proper relation to the other no matter what may be the diameter of the wheel to be cut or the number of its teeth. These devices comprise a toothed guide quadrant or member keyed on to the same shaft as that on which is the wheel to be cut and engaging with a toothed guide rack connected to the toothed rack tool-holder by an appropriate mechanical connection.

By way of example there will now be described apparatus according to the invention, shown diagrammatically on the accompanying drawing which illustrates first a method of working applied to the cutting of straight toothed spur gearing, then a method of cutting cone or bevel gearing.

Figure 1:
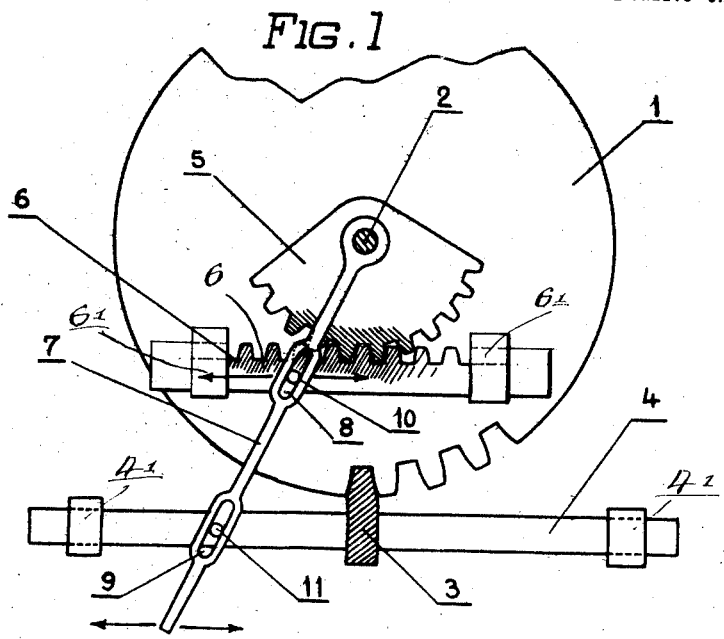
Figure 2:
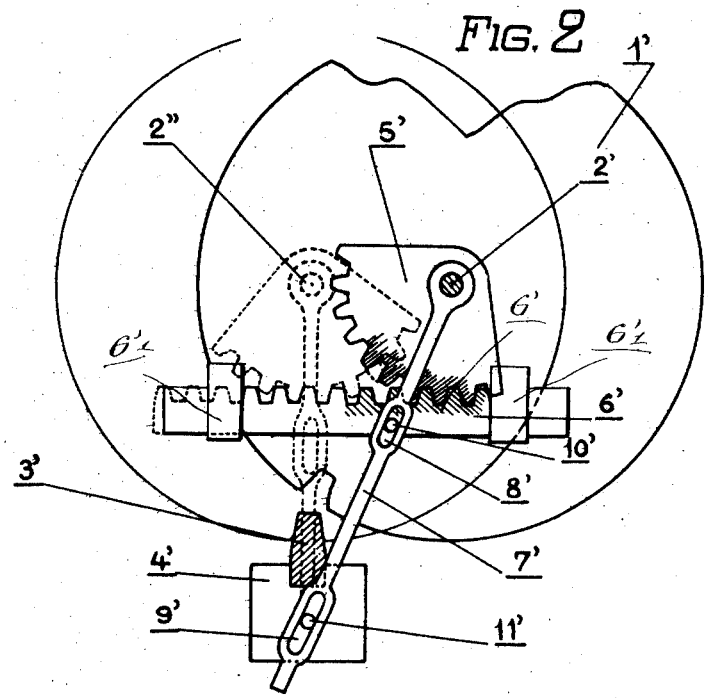

Figure 1 and 2 relate to the straight toothed spur gear cutting and illustrate respectively the case where the wheel to be cut and the toothed rack tool-holder are both movable, and the case where the toothed rack tool-holder is fixed, the wheel to be cut alone being movable.

Figs. 3 and 4 illustrate similarly to Figs. 1 and 2 respectively the cone or bevel gear cutting.

In Fig. 1 the wheel 1 which it is proposed to cut with teeth for straight tooth gearing is keyed on to the shaft 2, and the tool 3, which has a reciprocating movement perpendicular to the plane of the wheel 1, is mounted on a support 4 with a cutter of rack tooth formation. The wheel 1 and the support 4 should receive by suitable connection one with the other a movement corresponding to the rolling without sliding of the primitive or pitch circle of the gear wheel on the primitive or pitch line of a toothed rack engaging with it and which would be tangent to it. In order to obtain this result, a toothed guide quadrant 5 is keyed on to the shaft 2 and engages with a toothed guide rack 6 supported by bearings 6'. On the shaft 2 is freely pivoted a connecting rod 7 formed with two guide slots 8 and 9 in which are engaged the pins 10 and 11 of the toothed racks 6 and 4. Owing to the connection thus established the wheel 1 and the support 4 have at all times a relative movement of displacement corresponding to the theoretically correct rolling. The same arrangement of the toothed guide quadrant 5 and the toothed guide rack 6 can be employed whatever the diameter of the wheel 1 and no matter what the number of its teeth.

The mechanism can be modified in such a manner as to be adaptable to all known machines in which the movement of rotation of one of the members and the linear movement of the other which are necessary for the correct cutting of toothed gearing can be given either separately to the wheel to be cut, and to the toothed rack tool holder (each of these members receiving indifferently either the one or the other movement) or the two said members can have the desired movements imparted to them simultaneously or one only of said members can have both said movements imparted to it simultaneously.

Fig. 2 diagrammatically illustrates an arrangement wherein the movement of rotation and the linear movement are both given to the wheel to be cut, the toothed rack tool-holder being fixed. The members are the same as those of the arrangement shown in Fig. 1 and are indicated by the same letters of reference distinguished however by an index. As the point $11^1$ is fixed and the shaft $2^1$ is rotated the rolling of the toothed guide quadrant $5^1$ on the toothed guide rack $6^1$ simultaneously produces the rotation of the wheel $1^1$ and the linear displacement of its axis from $2^1$ to $2^{11}$. In this movement the tool $3^1$ having a reciprocating movement parallel to the axis $2^{11}$ is continually in the correct working position in relation to the wheel $1^1$.

The mechanism is applicable as will now be described to the cutting of cone or bevel gear wheels.

In Fig. 3, the conical gear to be cut is shown at 12 having its apex at 13, and located above the plate rack tool support 14. The plate 14 is provided with a guide slot in which reciprocates a tool 25, the axis of movement of which passes through the axis 15. On the axis 15, on which is keyed the cone 12 to be cut, there is likewise keyed a guide segment 16, meshing with a rack 17, suitably supported in bearings 26. At a point 18 at the axis 15 there is pivoted a rod 19 provided with two slots 20 and 21 in which are engaged respectively the pins 22 and 23 of the guide racks 17 and 24, the second rack 24 being supported in bearings 27 connected to the frame 28 of the machine. This second rack 24 meshes with the tool supporting rack 14. If the axis 15 is rotated, the tooth guide quadrant 16 engages the toothed guide rack 17 and this, through the connecting rod 19, engages the toothed rack 24 which in its turn gives the required angular movement to the tool holder plate 14. It is evident then that the cone wheel 12 mounted on the axis 15 and the reciprocating movement of the tool 25 mounted on the plate 14 receive one in relation to the other a correct rolling movement corresponding to the theoretically correct conditions. Only one apparatus is necessary to cut all the cone or bevel gear wheels of a predetermined angle to the apex whatever may be the radius and the number of teeth thereof.

The improved apparatus can be applied to the cutting of teeth of any profile whatever as well for straight cone or bevel gears as for helical or worm gears, that is to say, the profile of the tooth on the primitive cone 12 can be defined either by the rolling of a straight line or of a curve whether or not such rolling be about the apex 13 of the cone.

The apparatus can also be adapted, as that of Figs. 1 and 2 to cases where the two components of the rolling movement are impressed either separately on one or other of the two members or simultaneously on one and the same member.

Fig. 4 illustrates an arrangement where the two components of the movement are imparted to the cone or bevel wheel $12^1$, the tool holder plate $14^1$ remaining stationary. This apparatus consists of the same elements as those of the apparatus shown in Fig. 3, the parts being indicated by the same references distinguished however by in index. Assuming the bevel gear to be cut to be in the initial position $12^1$, if a movement of rotation is given to the axis $15^1$, the toothed guide quadrant $16^1$ engages the toothed guide rack $17^1$ and also through the connecting rod $19^1$, the second toothed rack $24^1$ which rolls on the toothed rack tool holder plate $14^1$ which is fixed; the bevel or conical gear $12^1$ is consequently caused to roll then on the plate $14^1$ until, for example, it assumes the position $12^{11}$, its axis occupying the position $15^{11}$. During the whole of this movement the respective positions of the tool and the cone or bevel wheel to be cut are correct.

The apparatus enables absolute precision to be obtained in cutting, no mattter what gearing since the blanks to be cut and the tool have always one relatively to the other the theoretically correct movement of rolling. In actual use the apparatus moreover has the advantage of necessitating but one set of guide members for the cutting of all gear wheels, which obviates the adjustments and manipulations necessary with existing gear cutting apparatus which are the cause of frequent errors.

What I claim as my invention and desire to secure by Letters Patent is:—

In a gear cutting machine in which the gear to be cut is attacked by a tool having a rolling movement with respect thereto, a control device for this rolling movement comprising a gear guide fixed to the wheel to be cut, a guide rack meshing with said gear guide, and a mechanical connection between said guide rack and the tool support.

In testimony whereof I have affixed my signature.

RENÉ LOUIS JULES DELAMARE.